United States Patent
Niu et al.

(10) Patent No.: US 10,651,728 B2
(45) Date of Patent: May 12, 2020

(54) POWER SUPPLY DEVICE AND CONTROL METHOD THEREOF

(71) Applicant: DELTA ELECTRONICS, INC., Taoyuan (TW)

(72) Inventors: Hsin-Chung Niu, Taoyuan (TW); Chih-Hong Wu, Taoyuan (TW); Chia-Hao Chang, Taoyuan (TW); Ming-Hsiang Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/599,450

(22) Filed: May 18, 2017

(65) Prior Publication Data
US 2018/0097442 A1 Apr. 5, 2018

(30) Foreign Application Priority Data
Oct. 4, 2016 (TW) .............................. 105132039 A (51) Int. Cl.
*H02M 1/42* (2007.01)
*G05F 1/70* (2006.01)
(Continued)

(52) U.S. Cl.
CPC ............ *H02M 1/4266* (2013.01); *G05F 1/70* (2013.01); *G05F 5/00* (2013.01); *H02M 1/32* (2013.01);
(Continued)

(58) Field of Classification Search
CPC .......... G05F 1/445; G05F 1/455; H02M 5/57; H02M 5/2573; B23K 11/248
(Continued)

(56) References Cited

U.S. PATENT DOCUMENTS

| 6,266,260 B1* | 7/2001 | Zahrte, Sr. .............. H02J 9/062 363/132 |
| 2006/0022648 A1* | 2/2006 | Ben-Yaakov ....... H02M 1/4225 323/222 |

(Continued)

FOREIGN PATENT DOCUMENTS

| CN | 101162850 A | 4/2008 |
| CN | 103812315 A | 5/2014 |

(Continued)

OTHER PUBLICATIONS

XueChao, Liu et al., "UCC28070 Implement Bridgeless Power Factor Correction (PFC) Pre-Regulator Design," SLUA517—Jul. 2009, pp. 1-13, file:///H:/1_APPLICATIONS/15_599450/TI_UCC28070%20Implement%20Bridgeless%20PFC%20Pre-Regulator%20Design.pdf.*

*Primary Examiner* — Nguyen Tran
*Assistant Examiner* — Monica Mata
(74) *Attorney, Agent, or Firm* — CKC & Partners Co., LLC (57) ABSTRACT

A power supply device includes a PF correction circuit, a power switching circuit and a control circuit. The PF correction circuit converts an input voltage to a bus voltage according to a control signal to supply a later stage circuit. The power switching circuit selectively switches to conduct a first source or a second source to the PF correction circuit to provide the input voltage to the PF correction circuit. The control circuit outputs the control signal to the PF correction circuit. When the control circuit detects a first voltage of the first source connecting to the PF correction circuit is abnormal, the control circuit determines whether a second voltage of the second source is smaller than the bus voltage and controls the power switching circuit to switch when the (Continued)

second voltage is smaller than the bus voltage to conduct the second source to the PF correction circuit.

15 Claims, 6 Drawing Sheets

(51) Int. Cl.
    *G05F 5/00*         (2006.01)
    *H02M 1/36*       (2007.01)
    *H02M 1/32*       (2007.01)
    *H02M 1/00*       (2006.01)

(52) U.S. Cl.
    CPC ........... *H02M 1/36* (2013.01); *H02M 1/4225* (2013.01); *H02M 2001/0006* (2013.01); *H02M 2001/0032* (2013.01); *H02M 2001/0083* (2013.01); *Y02B 70/126* (2013.01); *Y02P 80/112* (2015.11)

(58) Field of Classification Search
    USPC .......................................................... 323/300
    See application file for complete search history.

(56) References Cited

U.S. PATENT DOCUMENTS

| | | | |
|---|---|---|---|
| 2008/0310196 A1* | 12/2008 | Lin | H02M 1/36 363/49 |
| 2011/0148204 A1 | 6/2011 | DiMarco et al. | |
| 2013/0223120 A1* | 8/2013 | Dragojevic | H02M 7/06 363/126 |
| 2015/0123473 A1 | 5/2015 | Braylovskiy et al. | |

FOREIGN PATENT DOCUMENTS

| | | |
|---|---|---|
| CN | 104578383 A | 4/2015 |
| CN | 204858725 U | 12/2015 |
| CN | 105551885 A | 5/2016 |
| TW | 200847574 A | 12/2008 |
| TW | 201407929 A | 2/2014 |

\* cited by examiner

POWER SUPPLY DEVICE AND CONTROL METHOD THEREOF

RELATED APPLICATIONS

This application claims priority to Taiwan Application Serial Number 105132039, filed Oct. 4, 2016, which is herein incorporated by reference.

BACKGROUND

Technical Field

The present disclosure relates to a power supply device, and in particular, to a power supply device with ac backup ability.

Description of Related Art

For power supply device nowadays, when switching the power supply side to execute the ac backup function, additional semiconductor switches are required to control the electricity supply between the input power source and the output power, in order to prevent large inrush current. However, the switching operation time required for the power supply increases due to characteristic of the semiconductor switches, such that large capacitor are required to be arranged in the power supply to maintain the normal operation, which causes the size of the power supply increased.

In addition, additional arranged semiconductor switches also causes the loss of the power, and affect the overall conversion efficiency of the device. Therefore, an important area of research in the field involves ways in which to simplify the ac backup control method for power supply, reduce the size of the power supply and increase the conversion efficiency.

SUMMARY

One aspect of the present disclosure is a power supply device. The power supply device includes a power factor correction circuit, a power switching circuit, and a control circuit. The power factor correction circuit includes an energy storage capacitor, and is configured to convert an input voltage to a bus voltage between two terminals of the energy storage capacitor according to a control signal so as to supply power to a later stage circuit. The power switching circuit is configured to selectively switch to conduct a first source or a second source to the power factor correction circuit, in order to provide the input voltage to the power factor correction circuit. The control circuit is configured to output the control signal to the power factor correction circuit. When the control circuit detects a first voltage of the first source connecting to the power factor correction circuit is abnormal, the control circuit determines whether a second voltage of the second source is smaller than the bus voltage, and controls the power switching circuit to switch when the second voltage is smaller than the bus voltage to conduct the second source to the power factor correction circuit.

Another aspect of the present disclosure is a control method for a power supply device. The control method includes: conducting, by a power switching circuit, a first source to a power factor correction circuit to provide an input voltage to the power factor correction circuit; converting, by the power factor correction circuit, the input voltage to a bus voltage between two terminals of an energy storage capacitor according to a control signal; detecting, by a control circuit, a first voltage of the first source conducting to the power factor correction circuit; determining, by the control circuit, whether a second voltage of a second source is smaller than the bus voltage when detecting the first voltage is abnormal; and controlling, by the control circuit, the power switching circuit to switch when the second voltage is smaller than the bus voltage to conduct the second source to the power factor correction circuit.

BRIEF DESCRIPTION OF THE DRAWINGS

The disclosure can be more fully understood by reading the following detailed description of the embodiments, with reference made to the accompanying drawings as follows.

DETAILED DESCRIPTION

The embodiments herein described are by examples, and are not intended to be limiting. Alternatives, modifications and equivalents may be included within the spirit and scope of the disclosure as defined by the appended claims. Drawings are not drawn to scale and not meant to limit the actual embodiments of the present disclosure. Wherever possible, same reference numbers are used in the drawings and the description to refer to the same or like parts for better understanding. While method steps are disclosed herein as a series of acts or events, some may occur in different orders and/or concurrently with other acts or events apart from those described herein. The term "coupled" and "connected" may be used to indicate that two or more elements cooperate or interact with each other, and may also be termed electrically coupled/connected. The terms "first," "second," etc., are used to distinguish one element from another.

Figure 1:
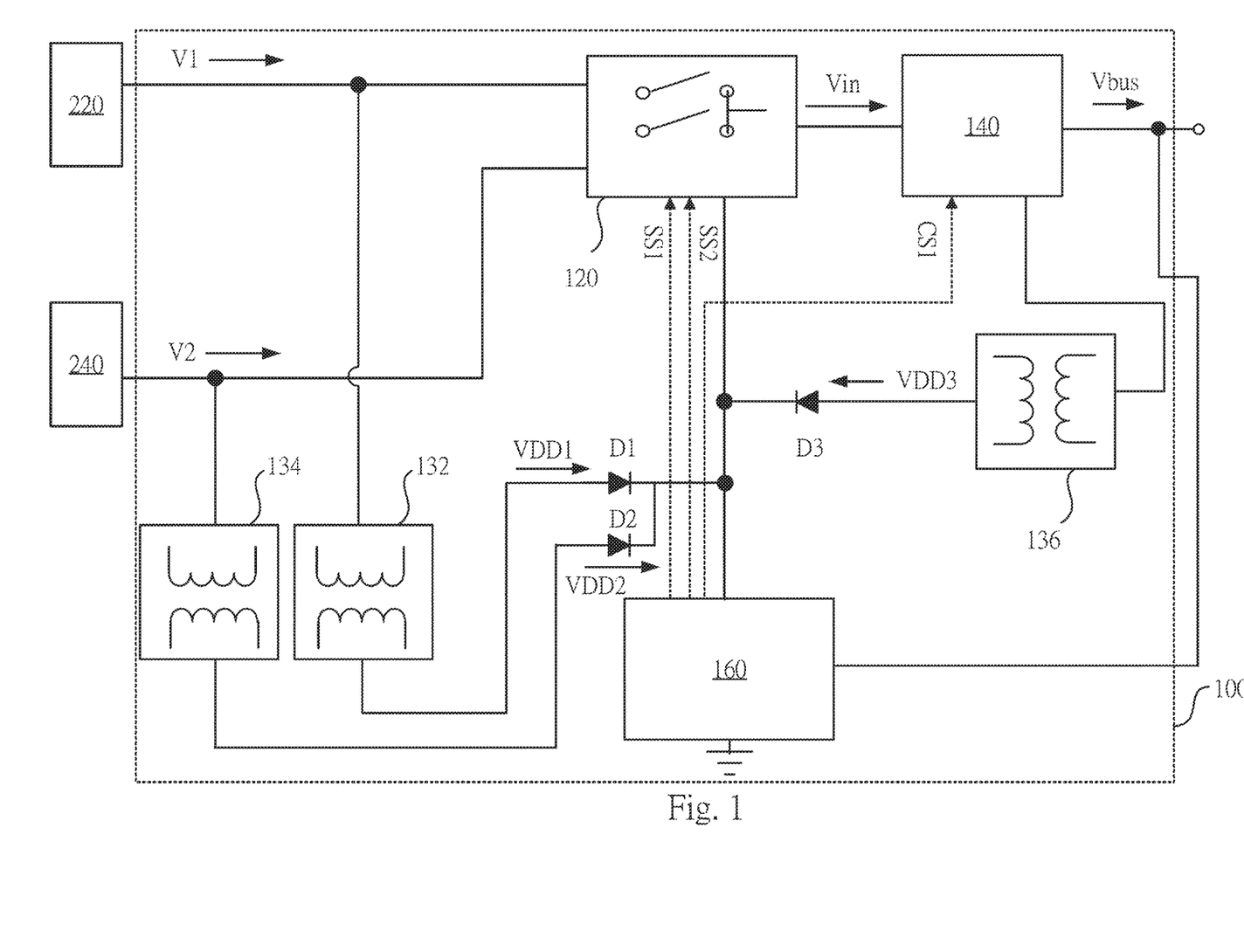
FIG. 1 is a diagram illustrating a backup power supply device according to some embodiments of the present disclosure.

Reference is made to FIG. 1. FIG. 1 is a diagram illustrating a backup power supply device 100 according to some embodiments of the present disclosure. As shown in FIG. 1, in some embodiments, the power supply device 100 may selectively receive one of the voltages V1, V2 as the ac input voltage Vin from a plurality of sources 220, 240, and perform voltage conversion to provide a bus voltage Vbus so as to supply power to a later stage circuit.

Specifically, in some embodiments, the power supply device 100 includes a power switching circuit 120, a power factor correction circuit 140 and a control circuit 160. The input side of the power switching circuit 120 is electrically coupled to each of the sources 220, 240, and the output side of the power switching circuit 120 is electrically coupled to the input side of the power factor correction circuit 140. The output side of the power factor correction circuit 140 is configured to be electrically coupled to the later stage circuit so as to supply power to the later stage circuit.

In some embodiments, the control circuit 160 is electrically coupled to the power switching circuit 120 and the power factor correction circuit 140. In addition, the control circuit 160 may also detect the voltage signal of the lines respectively with the voltage detecting unit of each of the lines. For example, the control circuit 160 may respectively detect the voltages V1, V2, the ac input voltage Vin, and the bus voltage Vbus with corresponding voltage detecting unit, so as to perform control accordingly. Specifically, the control circuit 160 is configured to output the switching signal SS1, SS2 to the power switching circuit 120 to control the power switching circuit 120 to conduct one of the sources 220, 240 to the power factor correction circuit 140, and output the control signal CS1 to the power factor correction circuit 140 to control the operation of the power factor correction circuit 140, in which the specific operating method will be explained in accompanied with the corresponding drawings in the following paragraphs.

Furthermore, the control circuit 160 is respectively electrically coupled to the sources 220, 240 via the isolating units 132, 134, and electrically coupled to the power factor correction unit 140 via the isolating unit 136. For example, as shown in FIG. 1, in some embodiments, the first side of the isolating unit 132 is electrically coupled to the source 220, and the second side of the isolating unit 132 is electrically coupled to the control circuit 160 via the diode unit D1. Similarly, the first side of the isolating unit 134 is electrically coupled to the source 240, and the second side of the isolating unit 134 is electrically coupled to the control circuit 160 via the diode unit D2. The first side of the isolating unit 136 is electrically coupled to the power factor correction unit 140, and the second side of the isolating unit 136 is electrically coupled to the control circuit 160 via the diode unit D3.

Accordingly, in different operating stages, the power required by the control circuit 160 may be provided from the sources 220, 240 or from the power factor correction unit 140. Specifically, at the initial stage, the power factor correction unit 140 is not activated yet. At the time, the control circuit 160 may receive an activating operation voltage VDD1 and/or VDD2 from the source 220 and/or the source 240 via the isolating unit 132 and/or the isolating unit 134 during the activation, so as to activate the operation of the control circuit 160. On the other hand, when the power supply device 100 is activated, and the power factor correction circuit 140 is in the normal operation, the control circuit 160 may receive an operation voltage VDD3 from the power factor correction circuit 140 via the isolating unit 136. Similarly, as depicted in FIG. 1, in some embodiments, the operation voltage VDD3 may be supplied from the power factor correction circuit 140 via the isolating unit 136 for the power required by the power switching circuit 120, when the power factor correction circuit 140 is in the normal operation.

It is noted that, in some embodiments, the isolating units 132, 134 may be implemented by reinforce isolating devices, and the isolating unit 136 may be implemented by a basic isolating device in order to prevent the damage of the internal elements resulted from erroneous voltages V1 and V2. In addition, in some embodiments, the power required by the control circuit 160 may also be provided by an independent source, and the embodiment shown in FIG. 1 is only a possible example of the present disclosure and not meant to limit the present disclosure.

For the convenience of explanation, the detailed operations of the control circuit 160 outputting the switching signals SS1, SS2 and the control signal CS1 to control the power switching circuit 120 and the power factor correction circuit 140 will be discussed in relation to the embodiments depicted in the drawings.

Figure 2:
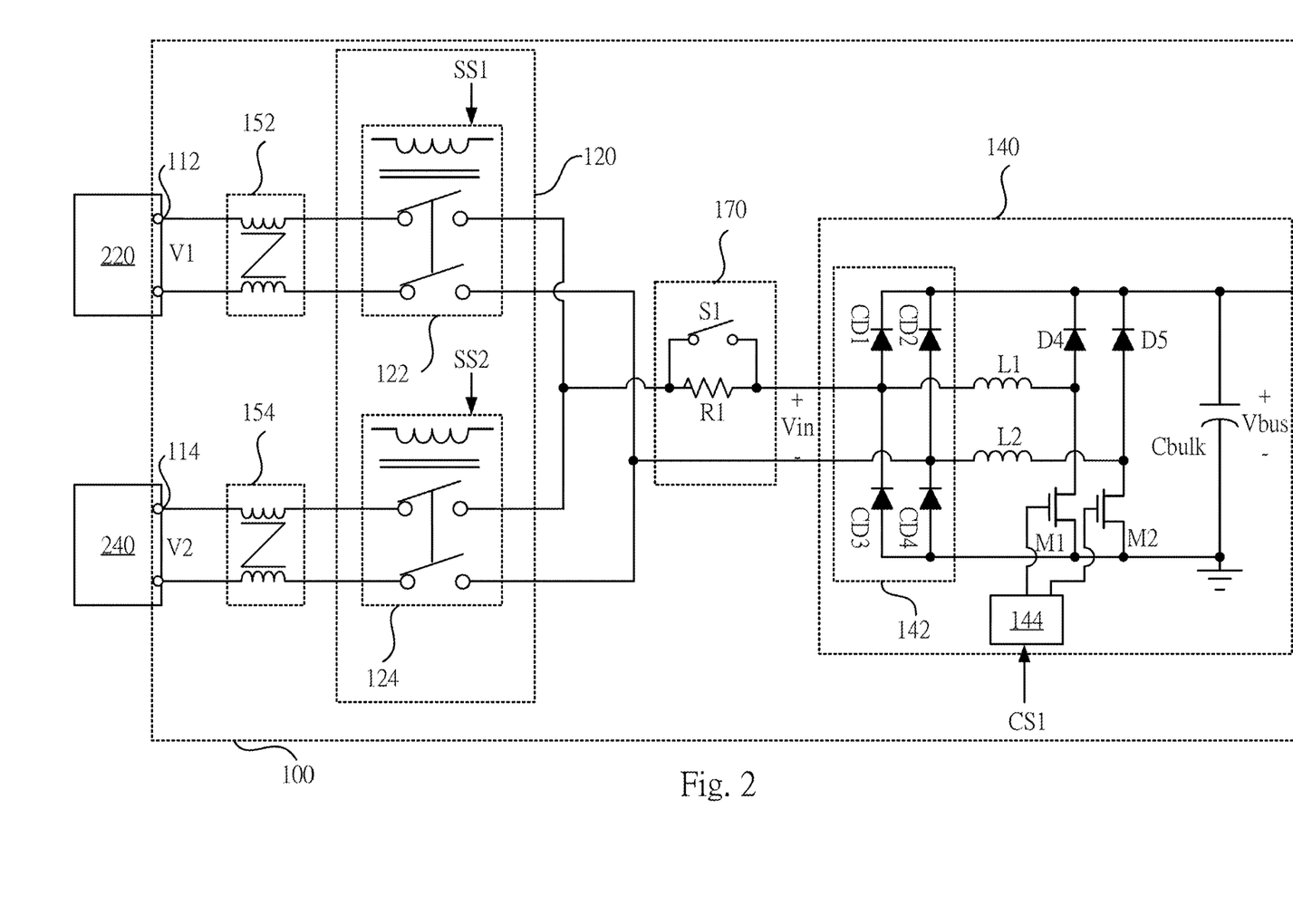
FIG. 2 is a diagram illustrating the power supply device according to some embodiments of the present disclosure.

Reference is made to FIG. 2. FIG. 2 is a diagram illustrating the power supply device 100 according to some embodiments of the present disclosure. With respect to the embodiments of FIG. 2, like elements in FIG. 1 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 2.

As depicted in FIG. 2, in some embodiments, the power supply device 100 further includes filter units 152, 154 and an inrush current limiting circuit 170. The filter units 152 and 154 are respectively coupled between the input terminals 112, 114 and the power switching circuit 120. The inrush current limiting circuit 170 is electrically coupled between the power switching circuit 120 and the power factor correction circuit 140. In addition, in some embodiments, the filter units 152, 154 may also be coupled to the latter stage of the power switching circuit 120. Alternatively stated, the arrangement of the filter units 152, 154 may be adjusted based on actual needs. Specifically, the arranged location and related configuration of the filter units 152, 154 are determined based on the acceptable range for the nodes of the power switching circuit 120. In some embodiments, the filter units 152, 154 may also be combined as a single filter unit arranged at the latter stage of the power switching circuit 120 to filter out the noise generated in the system of the power supply device 100.

Specifically, in some embodiments, the filter units 152, 154 are configured to filter the voltages V1, V2 respectively. For example, the filter units 152 and 154 may include common mode filters so as to reduce the electromagnetic interference in the voltages V1, V2, in order to prevent the noise generated in the system and high order harmonics in the signal damages the power supply device 100 or the later stage circuit.

As depicted in FIG. 2, in some embodiments the power switching circuit 120 includes switching units 122 and 124. For example, the switching units 122 and 124 may respectively include a relay. The switching unit 122 selectively conducts the source 220 and the power factor correction circuit 140 according to the switching signal SS1 output by the control circuit 160, so as to transmit the filtered voltage V1 as the input voltage Vin to the power factor correction circuit 140. Similarly, the switching unit 124 selectively conducts the source 240 and the power factor correction circuit 140 according to the switching signal SS2 output by the control circuit 160, so as to transmit the filtered voltage V2 as the input voltage Vin to the power factor correction circuit 140.

In some embodiments, the inrush current limiting circuit 170 includes an inrush current limiting resistor R1 and an inrush current limiting switch S1. As depicted in FIG. 2, the inrush current limiting resistor R1 and the inrush current limiting switch S1 are electrically coupled to each other in parallel. Specifically, when activating the power supply device 100, the inrush current limiting switch S1 remains off, such that the inrush current limiting resistor R1 is used to limit the inrush current and perform RC charging based on the ac input voltage Vin to gradually boost the bus voltage Vbus across two terminals of the energy storage capacitor Cbulk in the power factor correction circuit 140 to a predetermined target value. When the control circuit 160 detects the bus voltage Vbus is boosted to the target value (e.g., about 380 V), the control circuit 160 may output corresponding switching signal to control the inrush current limiting switch S1 to be on, in order to bypass the inrush current limiting resistor R1 and complete the pre-charging to the energy storage capacitor Cbulk of the power supply device 100. Thus, by the corresponding operation of the inrush current limiting circuit 170, the damage to the circuit of the power supply device 100 resulted from the inrush current during the activation is avoided, so as to realize the soft-start procedure of the power factor correction circuit 140.

As depicted in FIG. 2, in some embodiments, the power factor correction circuit 140 includes a voltage clamping unit 142, a driving unit 144, boost inductor units L1, L2, the diode units D4, D5, the switching units M1, M2 and the energy storage capacitor Cbulk. The voltage clamping unit 142 includes diode units CD1, CD2, CD3, and CD4. For example, in some embodiments, the cathode of the diode unit CD1 is electrically coupled to the positive terminal of the energy storage capacitor Cbulk. The anode of the diode unit CD1 is electrically coupled to the first terminal receiving the ac input voltage Vin. The cathode of the diode unit CD2 is electrically coupled to the positive terminal of the energy storage capacitor Cbulk. The anode of the diode unit CD2 is electrically coupled to the second terminal receiving the ac input voltage Vin. The cathode of the diode unit CD3 is electrically coupled to the anode of the diode unit CD1. The anode of the diode unit CD3 is electrically coupled to the negative terminal of the energy storage capacitor Cbulk. The cathode of the diode unit CD4 is electrically coupled to the anode of the diode unit CD2. The anode of the diode unit CD4 is electrically coupled to the negative terminal of the energy storage capacitor Cbulk. Accordingly, the voltage clamping unit 142 may, by the co-operation of the diode units CD1-CD4, clamp the voltage level input from the ac input voltage Vin to the power factor correction circuit 140 in the range of the bus voltage Vbus.

The cathode of the diode unit D4 is electrically coupled to the positive terminal of the energy storage capacitor Cbulk. The anode of the diode unit D4 is electrically coupled to the anode of the diode unit CD1 via the boost inductor unit L1. The cathode of the diode unit D5 is electrically coupled to the positive terminal of the energy storage capacitor Cbulk. The anode of the diode unit D5 is electrically coupled to the anode of the diode unit CD2 via the boost inductor unit L2. The first terminal of the switching unit M1 is electrically coupled to the anode of the diode unit D4. The second terminal of the switching unit M1 is electrically coupled to the negative terminal of the energy storage capacitor Cbulk. The first terminal of the switching unit M2 is electrically coupled to the anode of the diode unit D5. The second terminal of the switching unit M2 is electrically coupled to the negative terminal of the energy storage capacitor Cbulk. The control terminals of the switching units M1 and M2 are electrically coupled to the driving unit 144, to receive the corresponding driving signals and selectively switch the switching units M1 and M2 to be on or off.

As shown in FIG. 2, in some embodiments, the power factor correction circuit 140 may include bridgeless power factor corrector. In the positive half cycle of the ac input voltage Vin, when the switching unit M1 is on, the current may flow through the switching unit M1 and the parasitic diode of the switching unit M2 to store energy to the boost inductor units L1, L2. When the switching unit M1 is off, the current may flow through the conducted diode unit D4 and the parasitic diode of the switching unit M2 to supply power to the energy storage capacitor Cbulk and the loads. Similarly, in the negative half cycle of the ac input voltage Vin, when the switching unit M2 is on, the current may flow through the switching unit M2 and the parasitic diode of the switching unit M1 to store energy to the boost inductor units L2, L1. When the switching unit M2 is off, the current may flow through the conducted diode unit D5 and the parasitic diode of the switching unit M1 to supply power to the energy storage capacitor Cbulk and the loads.

Thus, the driving unit 144 may output corresponding driving signals according to the control signal CS1 output by the control circuit 160 to selectively turn on or turn off the switching units M1, M2, to achieve the power factor correction function of the power factor correction circuit 140. Therefore, the power supply device 100 may provide the bus voltage Vbus across two terminals of the energy storage capacitor Cbulk to supply power to the later stage circuit.

It is noted that, though the power factor correction circuit depicted in FIG. 2 applies the bridgeless power factor corrector structure, but the present disclosure is not limited thereto. In some other embodiments, the power factor correction circuit 140 may also be achieved by applying half-bridge or full-bridge power factor corrector structures.

Figure 3:
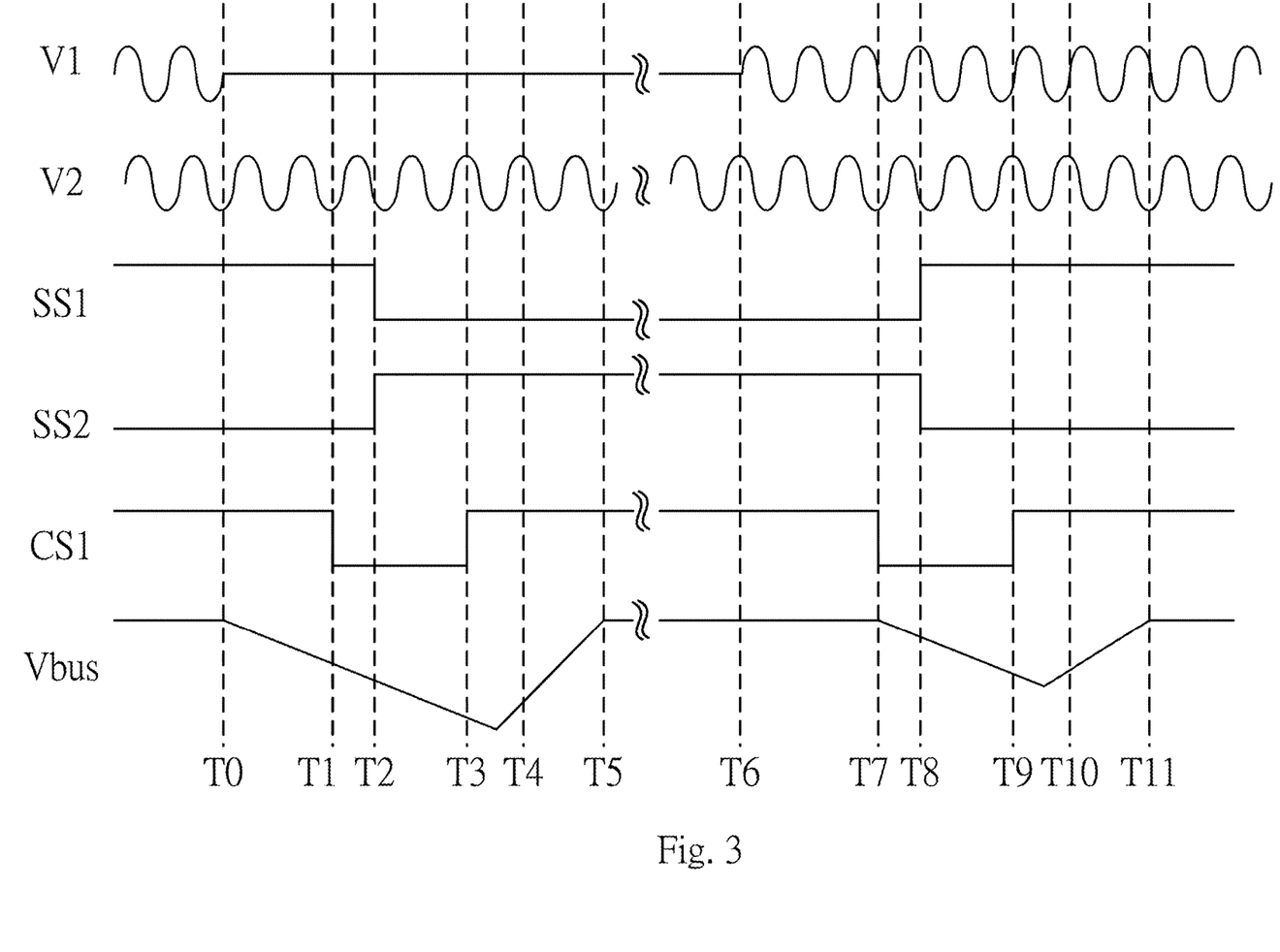
FIG. 3 is a wave diagram depicting the signals according to some embodiments of the present disclosure.
Figure 4:
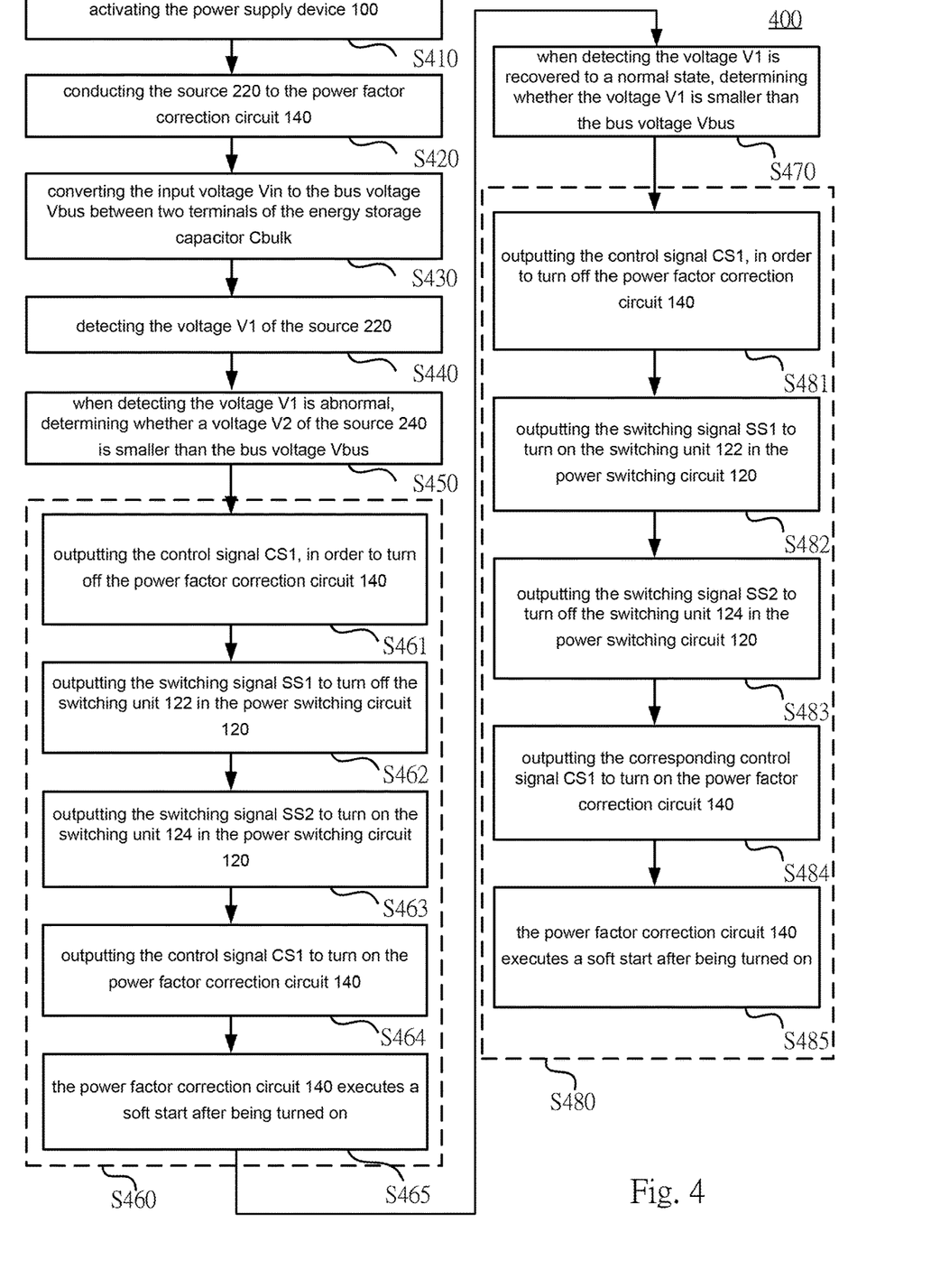
FIG. 4 is a flowchart diagram depicting a control method for the power supply device according to some embodiments of the present disclosure.

Reference is made to FIG. 3 and FIG. 4. FIG. 3 is a wave diagram depicting the signals according to some embodiments of the present disclosure. FIG. 4 is a flowchart diagram depicting a control method 400 for the power supply device 100 according to some embodiments of the present disclosure. In the following paragraphs, the embodiments shown in FIG. 3 and FIG. 4 are discussed to explain how the power supply device 100 supplies power to the later stage circuit continuously and switches to backup powers (e.g., source 240) to provide power when the error occurs or the electricity is lost in the currently electricity supply (e.g., source 220).

For the convenience and clearance of the discussion, the signal waveforms and the control method 400 depicted in FIG. 4 are discussed in accordance with the power supply device 100 depicted in FIG. 1 and FIG. 2, but is not limited thereto. As shown in FIG. 4, the control method 400 includes steps S410, S420, S430, S440, S450 and S460.

First, in the step S410, the power supply device 100 is activated. Specifically, the operation of activating the power supply device 100 in the step S410 includes: via an isolating unit 132 or an isolating unit 134, receiving an activating operation voltage VDD1 or VDD2 from the source 220 or the source 240 to activate the control circuit 160; charging the energy storage capacitor via the inrush current limiting resistor R1 in the inrush current limiting circuit 170, to boost the bus voltage Vbus to a predetermined value; controlling, by the control circuit 160, the inrush current limiting switch S1 in the inrush current limiting circuit 170 to be on to bypass the inrush current limiting resistor R1 when the bus voltage Vbus is boosted to the predetermined value; and receiving an operation voltage VDD3 via an isolating unit 136 from the power factor correction circuit 140 after the power factor correction circuit 140 is activated, in order to supply power to the control circuit 160. The above operation of activating the power supply device 100 is described in detailed in the embodiments shown in FIG. 1 and FIG. 2 and further explanation is omitted for the sake of brevity.

Figure 5:
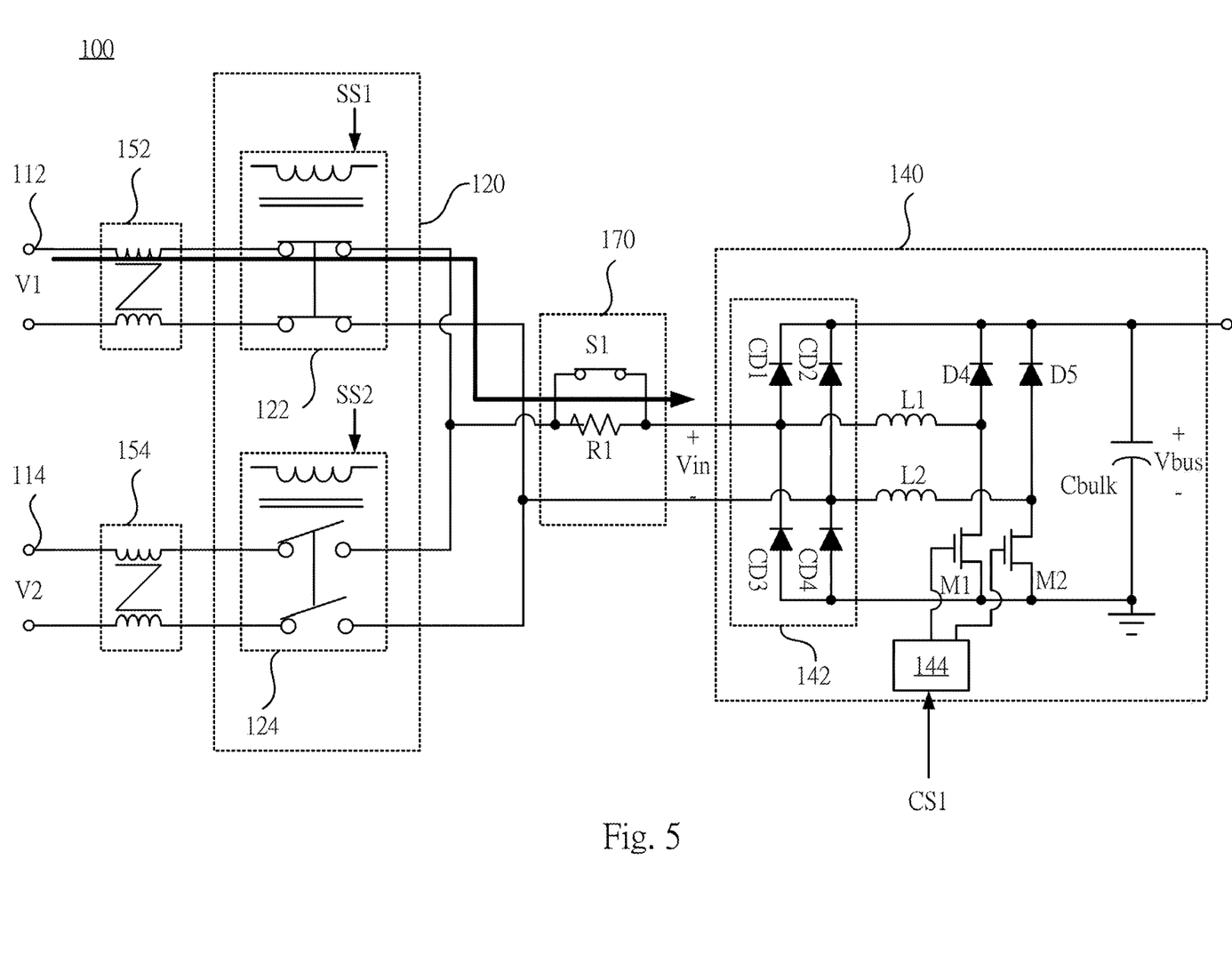
FIG. 5 is a diagram depicting the operation of the power supply device according to some embodiments of the present disclosure.

Next, in the step S420, the power supply device 100 conducts, by the power switching circuit 120, the source 220 to the power factor correction circuit 140 to provide the input voltage Vin to the power factor correction circuit 140. Reference is made to FIG. 5 in accompanied. FIG. 5 is a diagram depicting the operation of the power supply device 100 according to some embodiments of the present disclosure. As shown in FIG. 5, at the time the input voltage Vin received by the power factor correction circuit 140 is from the voltage V1 provided by the source 220 from the input terminal 112, and transmitted to the power factor correction circuit 140 via the filter unit 152, the switching unit 122 in the power switching circuit 120, and the inrush current limiting switch S1 in the inrush current limiting circuit 170.

Next, in the step S430, the power supply device 100 converts, by the power factor correction circuit 140, the input voltage Vin to the bus voltage Vbus between two terminals of the energy storage capacitor Cbulk according to the control signal CS1.

As depicted in FIG. 3, before the time T0, the voltages V1, V2 of the source 220, 240 are normal. The switching signal SS1 is at an enable level (e.g., a high level), and the switching signal SS2 is at a disable level (e.g., a low level). Accordingly, the power switching circuit 120 conducts the source 220 and the power factor correction circuit 140, such that the source 220 provides the voltage V1 as the input voltage Vin. At the time, the control signal CS1 is at the enable level such that the power factor correction 140 operates normally and maintains the bus voltage Vbus between two terminals of the energy storage capacitor Cbulk at the predetermined level.

Next, in the step S440, the power supply device 100 detects, by the control circuit 160, the voltage V1 of the source 220 conducting to the power factor correction circuit 140.

Next, in the step S450, when the control circuit 160 detects the voltage V1 is abnormal, the control circuit 160 determines whether a voltage V2 of the source 240 is smaller than the bus voltage Vbus.

Next. In the step S460, the power supply device 100 controls, by the control circuit 160, the power switching circuit 120 to switch when the voltage V2 is smaller than the bus voltage Vbus to conduct the source 240 to the power factor correction circuit 140.

As depicted in FIG. 3, at the time T0, a power failure occurs to the voltage V1 output by the source 220. At the time, since the power factor correction circuit 140 loses the electricity supply, the power required by the latter stage circuit is provided by the energy storage capacitor Cbulk, and thus the bus voltage Vbus starts to decrease.

When the control circuit 160 detects the voltage V1 of the source 220 conducting to the power factor correction circuit 140 is abnormal, after a period of hold-on time (e.g., about 9 ms), at the time T1, the control circuit 160 determines whether the voltage V2 of the source 240 for backup is smaller than the current bus voltage Vbus, and activates the ac backup mechanism when the voltage V2 is smaller than the bus voltage Vbus and controls the power switching circuit 120 to switch. Specifically, if the switching is performed when the voltage V2 of the source 240 for backup is larger than the bus voltage Vbus, the switching elements in the circuit may be damaged due to the large current stress in a short time. Therefore, before activating the ac backup mechanism, the control circuit 160 detects the voltage V2 of the source 240 and the bus voltage Vbus first to protect the circuit.

Specifically, the operation of conducting the source 240 to the power factor correction circuit 140 in the step S460 further includes S461, S462, S463, S464 and S465.

First, in the step S461, the control circuit 160 outputs the corresponding control signal CS1 at the time T1 after detecting the voltage V1 is abnormal, in order to turn off the power factor correction circuit 140.

As depicted in FIG. 3, at the time T1, the control circuit 160 switches the control signal CS1 from the enable level (e.g., a high level) to the disable level (e.g., the low level). Thus, the power factor correction circuit 140 is turned off correspondingly, and the current flowing through the power switching circuit 120 and the boost inductor units L1 and L2 is zero, so as to achieve zero-current switching in the following operation of the switching of the control switches. At the time the power required by the later stage circuit is still provided by the energy storage capacitor Cbulk, and thus the bus voltage Vbus continues to decrease.

Next, in the step S462, after a period of waiting time (e.g., about 2 ms), at a time T2 after the time T1, the current flowing through the power switching circuit 120 and the boost inductor units L1 and L2 decreases to zero. At the time, the control circuit 160 outputs a corresponding switching signal SS1 to turn off the switching unit 122 in the power switching circuit 120 in order to disconnect the source 220 and the power factor correction circuit 140. In the step S463, at the time T2, the control circuit 160 outputs a corresponding switching signal SS2 to turn on a switching unit 124 in the power switching circuit 120 in order to connect the source 240 and the power factor correction circuit 140.

As depicted in FIG. 3, at the time T2, the control circuit 160 switches the switching signal SS1 from the enable level (e.g., a high level) to the disable level (e.g., the low level), and switches the switching signal SS2 from the disable level (e.g., a low level) to the enable level (e.g., a high level). Thus, the backup source 240 may be connected to the power factor correction circuit 140. It is noted that, in the embodiments using relays as the switching units 122, 124, since the response time required to open the relay is shorter than the response time required to close the relay, even the switching units 122 and 124 receive the switching signals SS1 and SS2 respectively at the same time, the path between the source 220 and the power factor correction circuit 140 will be disconnected first, then the path between the source 240 and the power factor correction circuit 140 will be connected. Alternatively stated, the switching units 122 and 124 will not be on at the same time. At the time the power required by the later stage circuit is still provided by the energy storage capacitor Cbulk, and thus the bus voltage Vbus continues to decrease.

In addition, in some other embodiments, the control circuit 160 may also first switch the switching signal SS1 from the enable level to the disable level, and then switch the switching signal SS2 from the disable level to the enable level to prevent the switching units 122 and 124 in the power switching circuit 120 from being on at the same time.

Next, in the step S464, after a period of waiting time (e.g., about 9 ms), the control circuit 160 checks the source 220 is disconnected from the power factor correction circuit 140 and the source 240 is connected to the power factor correction circuit 140 at the time T3 after the time T2 and outputs the corresponding control signal CS1 to turn on the power factor correction circuit 140.

Next, in the step S465, the power factor correction circuit 140 executes a soft start after being turned on, so as to supply power to the energy storage capacitor Cbulk according to the source 240 in order to gradually increase the bus voltage Vbus to the predetermined level.

As depicted in FIG. 3, at the time T3, the control circuit 160 switches the control signal CS1 from the disable level (e.g., a low level) to the enable level (e.g., a high level). Thus, the power factor correction circuit 140 is turned on correspondingly. As the power factor correction circuit 140 executes the soft start to supply power to the energy storage capacitor Cbulk, the trend of the changes of the bus voltage Vbus may be reversed. For example, after a period of soft-start time (e.g., about 3 ms), at the time T4, the bus voltage Vbus gradually increases. At the time T5, the bus voltage Vbus is recovered to the original predetermined level and the power factor correction circuit 140 may execute the original power factor correction function again.

Figure 6:
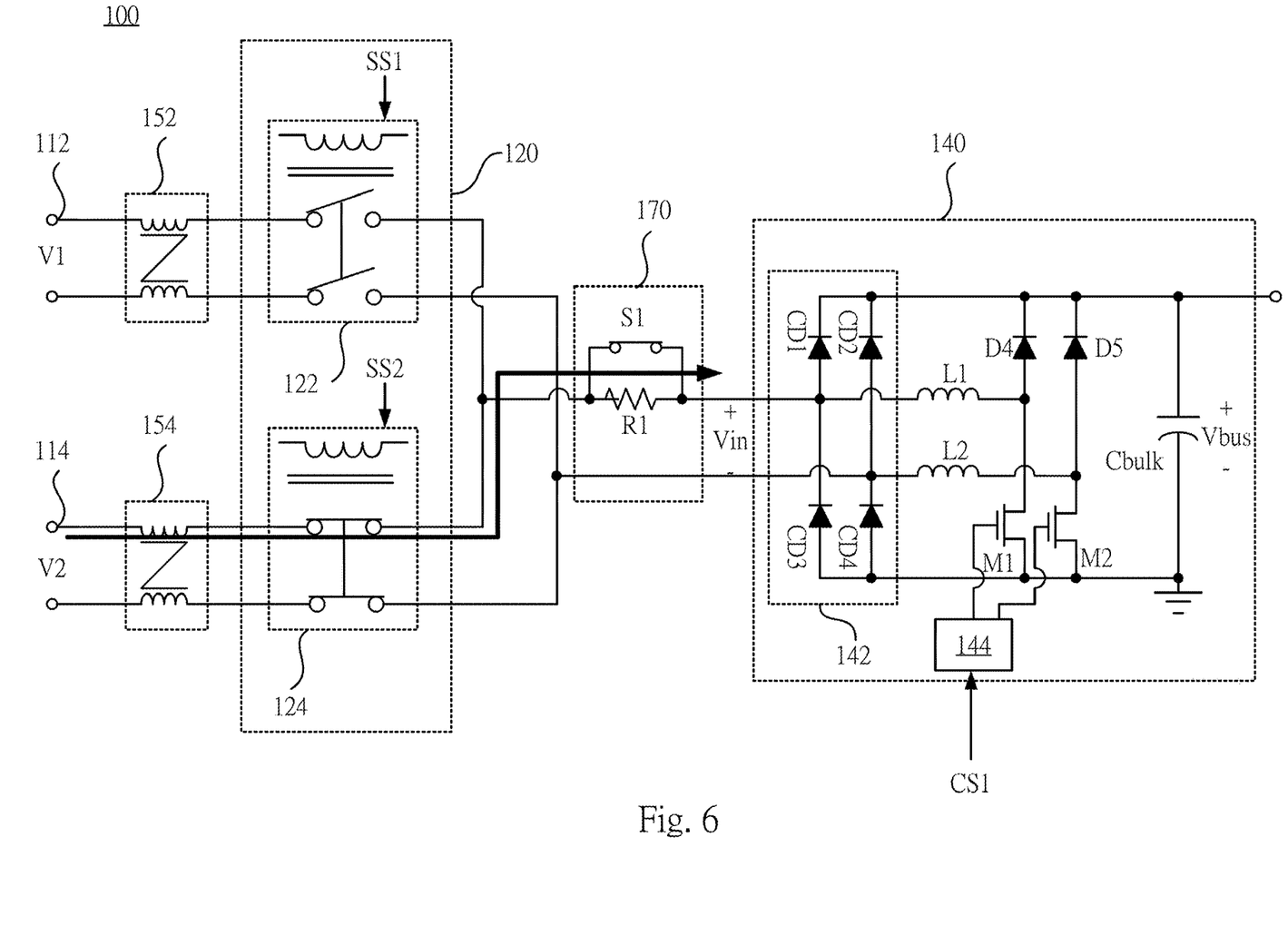
FIG. 6 is a diagram depicting the operation of the power supply device according to some embodiments of the present disclosure.

After the above steps S461-S465, the control circuit 160 may control the power switching circuit 120 to disconnect the source 220 from the power factor correction circuit 140 and connect the source 240 to the power switching circuit 140 to complete the operation of switching the source terminal to the backup power. Reference is made to FIG. 6. FIG. 6 is a diagram depicting the operation of the power supply device 100 according to some embodiments of the present disclosure. As depicted in FIG. 6, at the time the input voltage Vin received by the power factor correction circuit 140 is from the voltage V2 provided by the backup source 240 from the input terminal 114, and transmitted to the power factor correction circuit 140 via the filter unit 154, the switching unit 124 in the power switching circuit 120, and the inrush current limiting switch S1 in the inrush current limiting circuit 170.

In addition, in some embodiments, the control method 400 further includes steps S470 and S480. Specifically, in the step S470, when the power supply device 100 detects the voltage V1 is recovered to a normal state, the power supply device 100 determines, by the control circuit 160, whether the voltage V1 is smaller than the bus voltage Vbus. Next, in the step S480, when the voltage V1 is smaller than the bus voltage Vbus, the power supply device 100 controls, by the control circuit 160, the power switching circuit 120 to switch to conduct the source 220 to the power factor correction circuit 140 again.

As depicted in FIG. 3, at the time T6, the voltage V1 is recovered to the normal state. When the control circuit 160 detects the voltage V1 is recovered and maintained for a period of time (e.g., about 1 s), at the time T7, the control circuit 160 determines whether the voltage V1 is smaller than the bus voltage Vbus, and activates the switching mechanism when the voltage V1 is smaller than the bus voltage Vbus and controls the power switching circuit 120 switch back to the default priority source 220.

Specifically, the operation of conducting the source 220 to the power factor correction circuit 140 again includes steps S481, S482, S483, S484 and S485.

First, similar to the step S461, in the step S481, the control circuit 160 outputs the corresponding control signal CS1 to turn off the power factor correction circuit 140 at the time T7 after detecting the voltage V1 is recovered to the normal state, so as to achieve zero-current switching in the following operation of the switching of the control switches.

As depicted in FIG. 3, at the time T7, the control circuit 160 again switches the control signal CS1 from the enable level (e.g., a high level) to a disable level (e.g., a low level). Thus, the power factor correction circuit 140 is turned off correspondingly. At the time, the power required by the latter stage circuit is provided by the energy storage capacitor Cbulk, and thus the bus voltage Vbus starts to decrease.

Next, similar to the steps S462, S463, in the step S482, after a period of waiting time (e.g., about 2 ms), at a time T8 after the time T7, the current flowing through the power switching circuit 120 and the boost inductor units L1 and L2 is zero. At the time, the control circuit 160 outputs the corresponding switching signal SS1 to turn on the switching unit 122 in the power switching circuit 120 in order to connect the source 220 and the power factor correction circuit 140. In the step S483, at the time T7, the control circuit 160 outputs a corresponding switching signal SS2 to turn off the switching unit 124 in the power switching circuit 120 in order to disconnect the source 240 and the power factor correction circuit 140.

As depicted in FIG. 3, at the time T8, the control circuit 160 switches the switching signal SS1 from the disable level (e.g., the low level) to the enable level (e.g., the high level), and switches the switching signal SS2 from the enable level (e.g., the high level) to the disable level (e.g., the low level). Thus, the default priority source 220 may be connected to the power factor correction circuit 140. Similarly to the embodiments mentioned above, in the embodiments using relays as the switching units 122, 124, since the response time required to open the relay is shorter than the response time required to close the relay, even the switching units 122 and 124 receive the switching signals SS1 and SS2 respectively at the same time, the path between the source 240 and the power factor correction circuit 140 will be disconnected first, then the path between the source 220 and the power factor correction circuit 140 will be connected, and the switching units 122 and 124 will not be on at the same time. At the time the power required by the later stage circuit is still provided by the energy storage capacitor Cbulk, and thus the bus voltage Vbus continues to decrease.

In addition, in some other embodiments, the control circuit 160 may also first switch the switching signal SS2 from the enable level to the disable level, and then switch the switching signal SS1 from the disable level to the enable level to prevent the switching units 122 and 124 in the power switching circuit 120 from being on at the same time.

Next, similar to the step S464, in the step S484, after a period of waiting time (e.g., about 9 ms), the control circuit 160 checks the source 220 is connected to the power factor correction circuit 140 and the source 240 is disconnected from the power factor correction circuit 140 at the time T9 after the time T8 and outputs the corresponding control signal CS1 to turn on the power factor correction circuit 140.

Next, similar to the step S465, in the step S485, the power factor correction circuit 140 executes the soft start after being turned on, so as to supply power to the energy storage capacitor Cbulk according to the source 220 in order to gradually increase the bus voltage Vbus to the predetermined level.

As depicted in FIG. 3, at the time T9, the control circuit 160 switches the control signal CS1 from the disable level (e.g., the low level) to the enable level (e.g., the high level). Thus, the power factor correction circuit 140 is turned on correspondingly. As the power factor correction circuit 140 executes the soft start to supply power to the energy storage capacitor Cbulk, the trend of the changes of the bus voltage Vbus may be reversed. For example, after a period of soft-start time (e.g., about 3 ms), at the time T10, the bus voltage Vbus gradually increases. At the time T11, the bus voltage Vbus is recovered to the original predetermined level and the power factor correction circuit 140 may execute the original power factor correction function again.

After the above steps S481-S485, the control circuit 160 may control the power switching circuit 120 to disconnect the source 240 from the power factor correction circuit 140 and connect the source 220 to the power switching circuit 140 to complete the operation of switching from the backup power to the default priority power after the priority power is recovered and supplies power normally.

Therefore, by applying the power supply device 100 and control method 400 in the various embodiments mentioned above, the power supply device 100 may choose and switch the input power source when supplying power to the later stage circuit continuously. Thus, the risk that the system fails to supply power continuously under the circumstances of power failure or maintenance for the input source may be avoided. In addition, the power supply device 100 having the ac backup function may also increase the space utilization of the system, and make the maintenance of the power delivery device become more convenient.

In the various embodiments of the present disclosure, by the operation of closing the power factor correction circuit 140, the power switching circuit 120 is safely operated and configured to perform switching when the input side current is cut off and the energy storage capacitor Cbulk is used to provide the power to the later stage circuit, which improves the reliability. In addition, in various embodiments, there is no need to arrange additional control switch, so the overall conversion efficiency of the power supply device 100 may be improved, and the size of the power supply device 100 may be reduced. Since there is no need to arrange additional control switch, when switching the input sources 220, 240, there is no need to ensure the waiting time to cut off the semiconductor switching devices, and thus the switching procedures in the control process may be simplified and the overall switching time for power supply device 100 switching the input sources 220 and 240 is reduced. On the other hand, the circuit structure of the present disclosure may perform control with various power factor correctors such as bridgeless type, half-bridge type, full-bridge type, to meet the actual requirement of different application.

In addition, in the above embodiments, the control circuit 160 may be implemented by various ways such as a microcontroller unit (MCU), a Complex Programmable Logic Device (CPLD) or a Field-programmable gate array (FPGA). The circuit elements such as the switching units 122, 124, the isolation units 132, 134, 136, the filter units 152, 154, the voltage clamping unit 142, the driving unit 144, and the boost inductor units L1, L2, the diode units CD1-CD4, D1-D5, the switching units M1, M2, the inrush current limiting resistor R1, the inrush current limiting switch S1, and the energy storage capacitor Cbulk may be implemented by proper power electronic elements.

What is claimed is:

1. A power supply device, comprising:
    a power factor correction circuit comprising an energy storage capacitor, and configured to convert an input voltage to a bus voltage between two terminals of the energy storage capacitor according to a control signal so as to supply power to a later stage circuit;
    a power switching circuit configured to selectively switch to conduct a first source or a second source to the power factor correction circuit, in order to provide the input voltage to the power factor correction circuit;
    a control circuit configured to output the control signal to the power factor correction circuit, wherein when the control circuit detects a first voltage of the first source connecting to the power factor correction circuit is abnormal, the control circuit determines whether a second voltage of the second source is smaller than the bus voltage, and controls the power switching circuit to switch when the second voltage is smaller than the bus voltage to conduct the second source to the power factor correction circuit; and
    a third isolating unit, wherein a first side of the third isolating unit is electrically coupled to the power factor correction circuit, and a second side of the third isolating unit is electrically coupled to the control circuit, wherein the control circuit is configured to receive an operation voltage via the third isolating unit after the power factor correction circuit is activated, wherein after detecting the first voltage is abnormal, the control circuit controls the power switch circuit not to conduct the second source to the power factor correction circuit when the second voltage is not smaller than the bus voltage.

2. The power supply device of claim 1, wherein when the control circuit controls the power switching circuit to switch, the control circuit outputs the corresponding control signal to turn off the power factor correction circuit at a first time after detecting the first voltage is abnormal.

3. The power supply device of claim 2, wherein the power switching circuit comprises:
    a first switching unit configured to selectively conduct the first source and the power factor correction circuit according to a first switching signal; and
    a second switching unit configured to selectively conduct the second source and the power factor correction circuit according to a second switching signal;
    wherein when the control circuit controls the power switching circuit to switch, the control circuit outputs the corresponding first switching signal and second switching signal to turn off the first switching unit and turn on the second switching unit at a second time after the first time.

4. The power supply device of claim 3, wherein the control circuit checks the first source is disconnected from the power factor correction circuit and the second source is connected to the power factor correction circuit at a third time after the second time and outputs the corresponding control signal to turn on the power factor correction circuit.

5. The power supply device of claim 4, wherein the power factor correction circuit is configured to execute a soft start after being turned on at the third time, so as to supply power to the energy storage capacitor according to the second source in order to gradually increase the bus voltage to a predetermined level.

6. The power supply device of claim 1, wherein when the control circuit detects the first voltage of the first source is recovered to a normal state at a fourth time, the control circuit determines at a fifth time after the fourth time whether the first voltage is smaller than the bus voltage, and controls the power switching circuit to switch when the first voltage is smaller than the bus voltage to conduct the first source to the power factor correction circuit again.

7. The power supply device of claim 6, wherein when the control circuit controls the power switching circuit to switch, the control circuit outputs the corresponding control signal to turn off the power factor correction circuit at the fifth time.

8. The power supply device of claim 7, wherein the power switching circuit comprises:
    a first switching unit configured to selectively conduct the first source and the power factor correction circuit according to a first switching signal; and
    a second switching unit configured to selectively conduct the second source and the power factor correction circuit according to a second switching signal;
    wherein the control circuit outputs the corresponding second switching signal and first switching signal to turn off the second switching unit and turn on the first switching unit at a sixth time after the fifth time.

9. The power supply device of claim 8, wherein the control circuit checks the first source is connected to the power factor correction circuit and the second source is disconnected from the power factor correction circuit at a seventh time after the sixth time and outputs the corresponding control signal to turn on the power factor correction circuit.

10. The power supply device of claim 9, wherein the power factor correction circuit is configured to execute a soft start after being turned on at the seventh time, so as to supply power to the energy storage capacitor according to the first source in order to gradually increase the bus voltage to a predetermined level.

11. The power supply device of claim 1, wherein the power factor correction circuit comprises a bridgeless power factor corrector.

12. The power supply device of claim 1, further comprising:
a first isolating unit, wherein a first side of the first isolating unit is electrically coupled to the first source, and a second side of the first isolating unit is electrically coupled to the control circuit; and
a second isolating unit, wherein a first side of the second isolating unit is electrically coupled to the second source, and a second side of the second isolating unit is electrically coupled to the control circuit;
wherein the control circuit is configured to receive an activating operation voltage via the first isolating unit or the second isolating unit during the activation.

13. The power supply device of claim 1, further comprising an inrush current limiting circuit, and the inrush current limiting circuit comprises:
a current limiting resistor electrically coupled between the power switching circuit and the power factor correction circuit;
a current limiting switch electrically coupled to the current limiting resistor in parallel, wherein when the bus voltage between two terminals of the energy storage capacitor is boosted to a predetermined value, the control circuit controls the current limiting switch to be on to bypass the current limiting resistor.

14. A power supply device, comprising:
a power factor correction circuit comprising an energy storage capacitor, and configured to convert an input voltage to a bus voltage between two terminals of the energy storage capacitor according to a control signal so as to supply power to a later stage circuit;
a power switching circuit configured to selectively switch to conduct a first source or a second source to the power factor correction circuit, in order to provide the input voltage to the power factor correction circuit; and
a control circuit configured to output the control signal to the power factor correction circuit, wherein when the control circuit detects a first voltage of the first source connecting to the power factor correction circuit is abnormal, the control circuit determines whether a second voltage of the second source is smaller than the bus voltage, and controls the power switching circuit to switch when the second voltage is smaller than the bus voltage to conduct the second source to the power factor correction circuit,
wherein after detecting the first voltage is abnormal, the control circuit controls the power switch circuit not to conduct the second source to the power factor correction circuit when the second voltage is not smaller than the bus voltage,
wherein when the control circuit controls the power switching circuit to switch, the control circuit outputs the corresponding control signal to turn off the power factor correction circuit at a first time after detecting the first voltage is abnormal,
wherein the power switching circuit comprises:
a first switching unit configured to selectively conduct the first source and the power factor correction circuit according to a first switching signal; and
a second switching unit configured to selectively conduct the second source and the power factor correction circuit according to a second switching signal,
wherein when the control circuit controls the power switching circuit to switch, the control circuit outputs the corresponding first switching signal and second switching signal to turn off the first switching unit and turn on the second switching unit at a second time after the first time,
wherein the control circuit checks the first source is disconnected from the power factor correction circuit and the second source is connected to the power factor correction circuit at a third time after the second time and outputs the corresponding control signal to turn on the power factor correction circuit,
wherein the power factor correction circuit is configured to execute a soft start after being turned on at the third time, so as to supply power to the energy storage capacitor according to the second source in order to gradually increase the bus voltage to a predetermined level.

15. A power supply device, comprising:
a power factor correction circuit comprising an energy storage capacitor, and configured to convert an input voltage to a bus voltage between two terminals of the energy storage capacitor according to a control signal so as to supply power to a later stage circuit;
a power switching circuit configured to selectively switch to conduct a first source or a second source to the power factor correction circuit, in order to provide the input voltage to the power factor correction circuit; and
a control circuit configured to output the control signal to the power factor correction circuit, wherein when the control circuit detects a first voltage of the first source connecting to the power factor correction circuit is abnormal, the control circuit determines whether a second voltage of the second source is smaller than the bus voltage, and controls the power switching circuit to switch when the second voltage is smaller than the bus voltage to conduct the second source to the power factor correction circuit,
wherein after detecting the first voltage is abnormal, the control circuit controls the power switch circuit not to conduct the second source to the power factor correction circuit when the second voltage is not smaller than the bus voltage,
wherein when the control circuit detects the first voltage of the first source is recovered to a normal state at a fourth time, the control circuit determines at a fifth time after the fourth time whether the first voltage is smaller than the bus voltage, and controls the power switching circuit to switch when the first voltage is smaller than the bus voltage to conduct the first source to the power factor correction circuit again, wherein when the control circuit controls the power switching circuit to switch, the control circuit outputs the corresponding control signal to turn off the power factor correction circuit at the fifth time, wherein the power switching circuit comprises:
- a first switching unit configured to selectively conduct the first source and the power factor correction circuit according to a first switching signal; and
- a second switching unit configured to selectively conduct the second source and the power factor correction circuit according to a second switching signal, wherein the control circuit outputs the corresponding second switching signal and first switching signal to turn off the second switching unit and turn on the first switching unit at a sixth time after the fifth time, wherein the control circuit checks the first source is connected to the power factor correction circuit and the second source is disconnected from the power factor correction circuit at a seventh time after the sixth time and outputs the corresponding control signal to turn on the power factor correction circuit, wherein the power factor correction circuit is configured to execute a soft start after being turned on at the seventh time, so as to supply power to the energy storage capacitor according to the first source in order to gradually increase the bus voltage to a predetermined level.

* * * * *